United States Patent [19]
Karst et al.

[11] Patent Number: 5,728,970
[45] Date of Patent: Mar. 17, 1998

[54] MODULAR ELECTRICAL SYSTEM

[75] Inventors: Ronald E. Karst; Shawn J. Kondas, both of Kendallville, Ind.

[73] Assignee: Pent Assemblies, Inc., Kendallville, Ind.

[21] Appl. No.: 646,087

[22] Filed: May 7, 1996

[51] Int. Cl.[6] .................................................. H02G 3/26
[52] U.S. Cl. ................................... 174/48; 439/215
[58] Field of Search ............................ 174/48, 49, 58, 174/59; 52/220.7, 239; 403/329, 326; 160/135, 351; 439/215, 211, 216

[56] References Cited

U.S. PATENT DOCUMENTS

| | | | |
|---|---|---|---|
| 3,759,297 | 9/1973 | Anderson et al. | 174/48 X |
| 4,133,153 | 1/1979 | Hage | 52/220.7 |
| 4,203,639 | 5/1980 | VandenHoek et al. | 174/49 X |
| 4,277,123 | 7/1981 | Haworth et al. | 174/48 X |
| 4,775,328 | 10/1988 | McCarthy | 439/211 |
| 4,874,322 | 10/1989 | Dola et al. | 174/49 X |
| 5,092,786 | 3/1992 | Juhlin et al. | 439/215 |
| 5,158,472 | 10/1992 | Juhlin | 439/215 |
| 5,164,544 | 11/1992 | Snodgrass et al. | 174/48 |
| 5,274,970 | 1/1994 | Roberts | 52/239 X |
| 5,349,135 | 9/1994 | Mollenkopf et al. | 174/48 |
| 5,383,318 | 1/1995 | Kelley et al. | 52/220.7 X |

*Primary Examiner*—Kristine L. Kincaid
*Assistant Examiner*—Dean A. Reichard
*Attorney, Agent, or Firm*—Taylor & Associates, P.C.

[57] ABSTRACT

The invention is directed to a modular electrical system attachable to a modular office partition, including an electrical distribution assembly with at least two projections extending from one side thereof. At least two projection receiving members are associated with the partition, and engageable with a respective projection. At least one resilient retainer device is biased to a retaining position for securably and releasably maintaining at least one of the projections in engagement with a respective receiving member. The resilient retainer device is also movable to a disengaging position allowing the at least one projection to be disengaged from the respective receiving member.

21 Claims, 4 Drawing Sheets

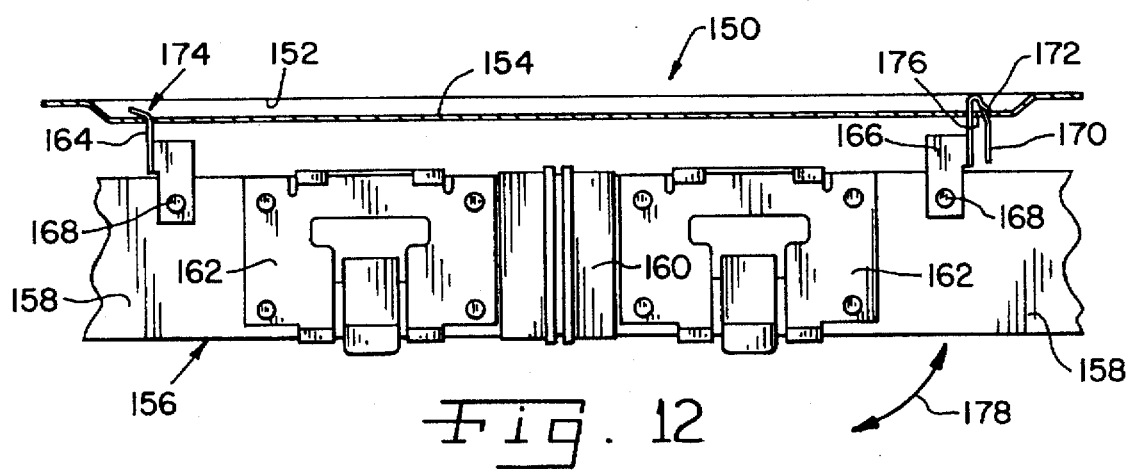

5,728,970

MODULAR ELECTRICAL SYSTEM

BACKGROUND OF THE INVENTION

1. Field of the Invention

The present invention relates to a modular electrical system for use with modular office partitions, and, more particularly, to such a modular electrical system which is attachable to a modular office partition.

2. Description of the Related Art

Modular office partitions may be connected at the ends thereof to define offices or cubicles. Such partitions may include a raceway which extends along the bottom thereof, in which is disposed an electrical distribution system for providing electrical power and/or data communication to a wall of the partition. A cover is typically disposed on each side of the partition along the raceway to provide access to the electrical distribution system therein. The electrical distribution system generally includes a plurality of electrical distribution assemblies which are connected end-to-end within the raceway.

An electrical distribution assembly which is disposed within the raceway may be connected to the partition in various known ways. For example, it is known that the electrical distribution assembly may include a plurality of plates which are connected to a channel that houses the electrical conductors of the electrical distribution assembly. The plates include laterally extending tabs with a slot or opening therein. A screw or the like is inserted through the opening in the tabs and into the bottom of the partition. A problem with such a structure is that a screwdriver, wrench or the like must be used to turn the screw into the partition. Typically, the partition must be placed on its side so that adequate access can be gained to the bottom of the partition for attaching the electrical distribution assembly to the partition.

Another known method involves forming a raceway within a partition using an upstanding thin wall extending symmetrically down the center of the raceway. The thin wall includes a lateral opening therein which is sized for receiving a connector block. The connector block includes at least two projections at the bottom thereof and at least two projections at the top thereof which are positioned on either side of the thin wall when the block is disposed in the lateral opening. A problem with this method is that a user is required to access both sides of the partition if the connector block is to be removed from the lateral opening. That is, one of the projections may be slightly depressed such that the connector block may be rotated away from the user toward the opposite side of the partition. However, if the partition is located against an outside wall, it may not be possible to access the opposite side of the partition to remove the connector block. Another problem with this method is that the connector block first must be installed in the lateral opening before any of the electrical outlets may be connected therewith. This again requires that the user have access to both sides of the partition, and does not allow for pre-assembly of the electrical distribution assembly. A further problem with this method is that the thin wall which extends through the raceway may interfere with the electrical conductors extending between the connector blocks, and further requires a user to have access to conductors placed on either side thereof.

It is also known to attach a plate to the bottom of a partition, with the plate including projections which extend downwardly and laterally therefrom. An electrical distribution assembly includes plates which are disposed on either side of a channel and have mounting ears extending therefrom. The mounting ears include holes therein which are sized for receiving the projections extending from the plate attached to the partition. A slidable locking plate associated with the mounting tabs is slidable between a first position allowing the projections to be received within the holes of the mounting ears, and a second position wherein the plate mechanically locks the projections within the holes of the mounting ears. A resilient spring extending from the locking plate engages the channel and holds the locking plate in whatever position it is placed by a user. A problem with this known structure is that the electrical distribution unit must be manually locked in place with the partition. This requires that a user hold the distribution unit in place with one hand such that the tabs extend into the openings of the mounting ears, and thereafter slide the locking plate into position with the other hand to lock the projections within the openings. Such a task may be awkward or difficult for a user to accomplish. Moreover, such an electrical distribution unit includes more than one locking plate which must be slid by the user. This again adds to the difficulty of use of this known structure.

What is needed in the art is an electrical distribution unit which may be relatively easily and quickly connected to a modular office partition without the use of tools.

SUMMARY OF THE INVENTION

The present invention provides an electrical distribution unit which simply slides into engagement with a bracket on a modular office partition and is held in place using a resilient retainer such as a spring catch or resilient projection. The electrical distribution unit may be engaged with the bracket without the use of tools.

The invention comprises, in one form thereof, a modular electrical system attachable to a modular office partition, including an electrical distribution assembly with at least two projections extending from one side thereof. At least two projection receiving members are associated with the partition, and engageable with a respective projection. At least one resilient retainer device is biased to a retaining position for securably and releasably maintaining at least one of the projections in engagement with a respective receiving member. The resilient retainer device is also movable to a disengaging position allowing the at least one projection to be disengaged from the respective receiving member.

An advantage of the present invention is that the electrical distribution unit is attachable to the office partition without the use of tools.

Another advantage is that the electrical distribution unit may be attached to or detached from the office partition from either side of the partition, without requiring access to the opposing side of the partition.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 12 is a side view of another embodiment of a modular electrical system of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
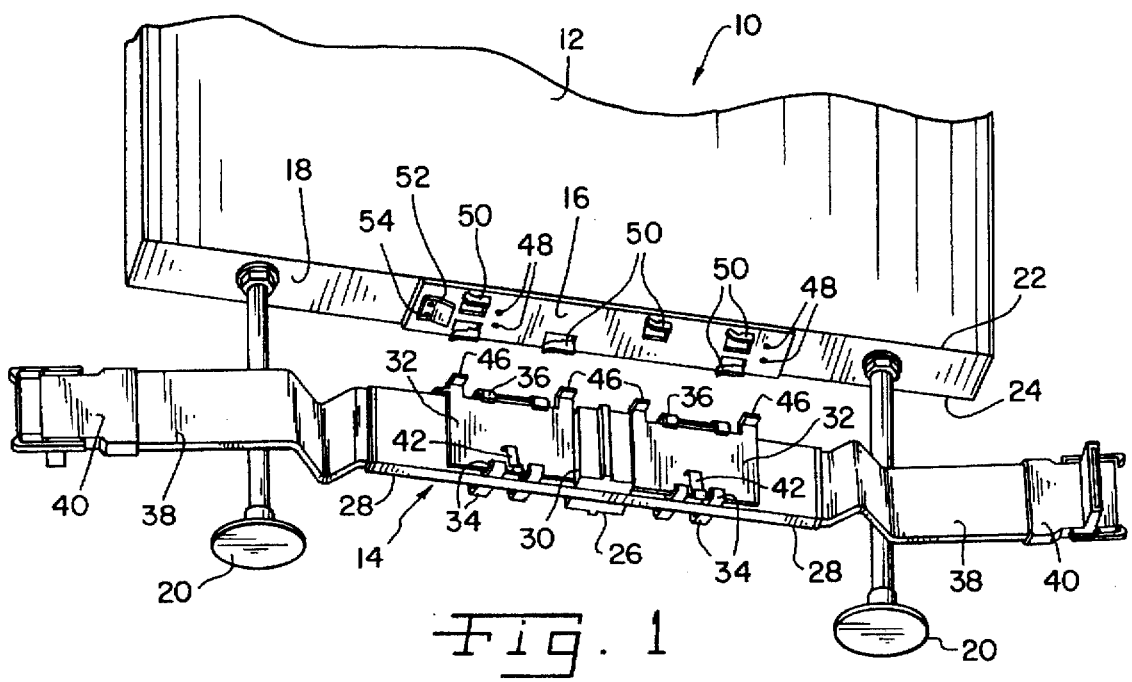
FIG. 1 is a perspective view of an embodiment of a modular electrical system of the present invention, with the electrical distribution assembly detached from the modular office partition.

Referring now to the drawings, and particularly to FIGS. 1–4, there is shown an embodiment of a modular electrical system 10 of the present invention, including a modular office partition 12, an electrical distribution assembly 14, and a bracket 16.

Partition 12 includes a bottom surface 18 from which legs 20 extend. A cover or the like (not shown) may be attached to partition 12 along either bottom side 22 and 24 so as to define a raceway with electrical distribution assembly 14 therein.

Electrical distribution assembly 14 includes a connector block 26 which is attached to channel 28. Flexible portions 38 interconnect channel 28 with opposing bi-directional end connectors 40. Connector block 26 includes four plug-in type ends, such as referenced at 30, for receiving mating connectors of an electrical outlet. Four plates 32 are respectively disposed adjacent to each plug-in type end 30, and include outlet engaging flanges 34, 36 for engaging and holding the respective electrical outlets. A spring 42 maintains the electrical outlet in engagement with a respective plate 32 and plug-in type end 30 of connector block 26.

According to one aspect of the present invention, each plate 32 includes a plurality of lateral projections 46 extending therefrom. Lateral projections 46 interconnect electrical distribution assembly 14 with bracket 16, as will be described in more detail hereinafter, with a single, sliding action and without the use of tools. Projections 46 are defined as lateral projections because they extend substantially laterally from a respective plate 32.

Bracket 16 is connected to office partition 12 using a plurality of fasteners, such as screws 48. Bracket 16 includes a plurality of projection receiving members 50 which are formed integral therewith, and connected to partition 12 via screws 48. In the embodiment shown in FIGS. 1–3, projection receiving members 50 are in the form of J-shaped hooks which are integrally formed with bracket 16. J-shaped hooks 50 are sized and configured such that lateral projections 46 are disposed above and extend laterally therepast, as shown in FIGS. 2 and 3, when electrical distribution assembly 14 is connected with bracket 16. Bracket 16 is provided with six J-shaped hooks 50 extending therefrom, and plates 32 define a total of eight lateral projections (i.e., four plates 32 with two lateral projections 46 each). Thus, it will be appreciated that two of lateral projections 46 extending from plates 32 are not engaged with a J-shaped hook 50 extending from bracket 16. However, it will also be easily appreciated that bracket 16 can be formed in a number of other configurations with more or less J-shaped hooks 50.

A resilient retainer in the form of a spring catch 52 is connected to bracket 16 via rivets 54 or the like. Spring catch 52 is engageable with at least one of projections 46 when projections 46 are engaged with J-shaped hooks 50, as shown in FIG. 2. When in the retaining position shown in FIG. 2, spring catch 52 securably and releasably maintains projections 46 in engagement with respective J-shaped hooks 50. Spring catch 52 may also be moved to a disengaging position by depressing the same in an upward position as indicated by arrow 56 in FIG. 2, such that lateral projections 46 may be disengaged from J-shaped hooks 50.

Figure 2:
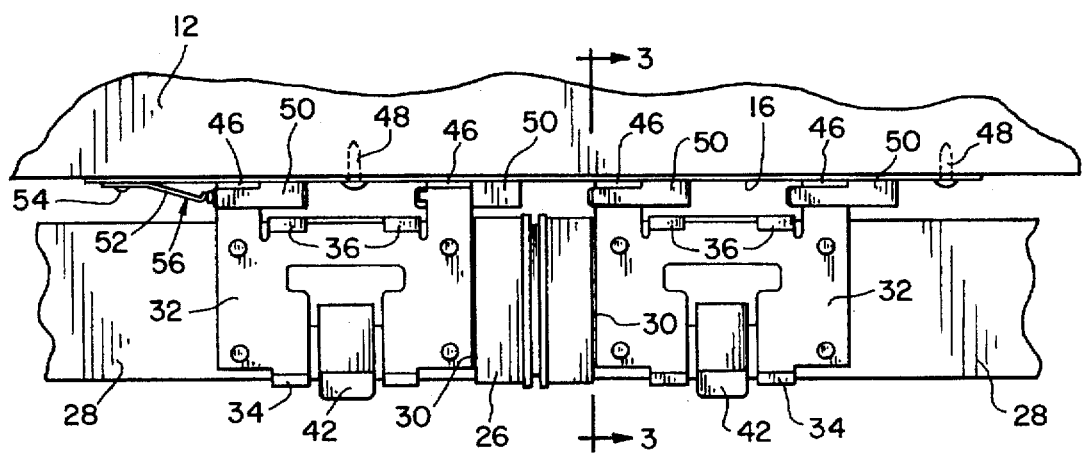
FIG. 2 is a side view of the system shown in FIG. 1, with the electrical distribution assembly attached to the modular office partition.
Figure 3:
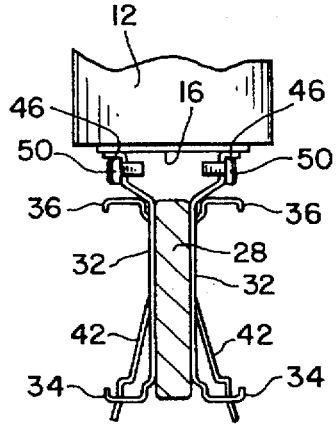
FIG. 3 is a sectional view taken along line 3—3 in FIG. 2.

To attach electrical distribution assembly 14 with bracket 16, a user places electrical distribution assembly 14 against bracket 16 such that lateral projections 46 are disposed immediately against bracket 16 and to the left of J-shaped hooks 50 (as shown in FIGS. 1 and 2). Electrical distribution assembly 14 is then slid in a horizontal direction such that lateral projections 46 simultaneously engage with respective J-shaped hooks 50. Upon completion of engagement between lateral projections 46 and J-shaped hooks 50, spring catch 52 snaps into position as shown in FIG. 2 and engages two lateral projections 46 to prevent disengagement between electrical distribution assembly 14 and bracket 16. To disengage electrical distribution assembly 14 from bracket 16, spring catch 52 is moved in an upward direction as indicated by arrow 56 in FIG. 2 so as to disengage lateral projections 46, and electrical distribution assembly 14 is slid to the left (as shown in FIG. 2) such that lateral projections 46 disengage from J-shaped hooks 50.

Figure 6:
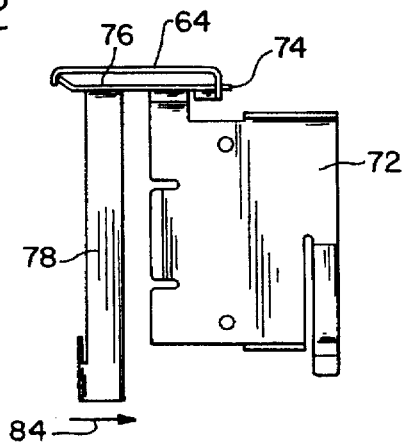
FIG. 6 is an enlarged, side view detailing interconnection between the electrical distribution assembly and bracket shown in FIG. 5.
Figure 4:
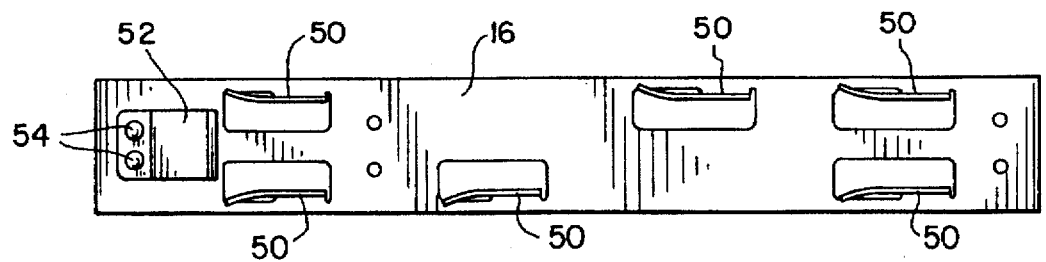
FIG. 4 is a plan view of the bracket shown in FIGS. 1 and 2.
Figure 5:
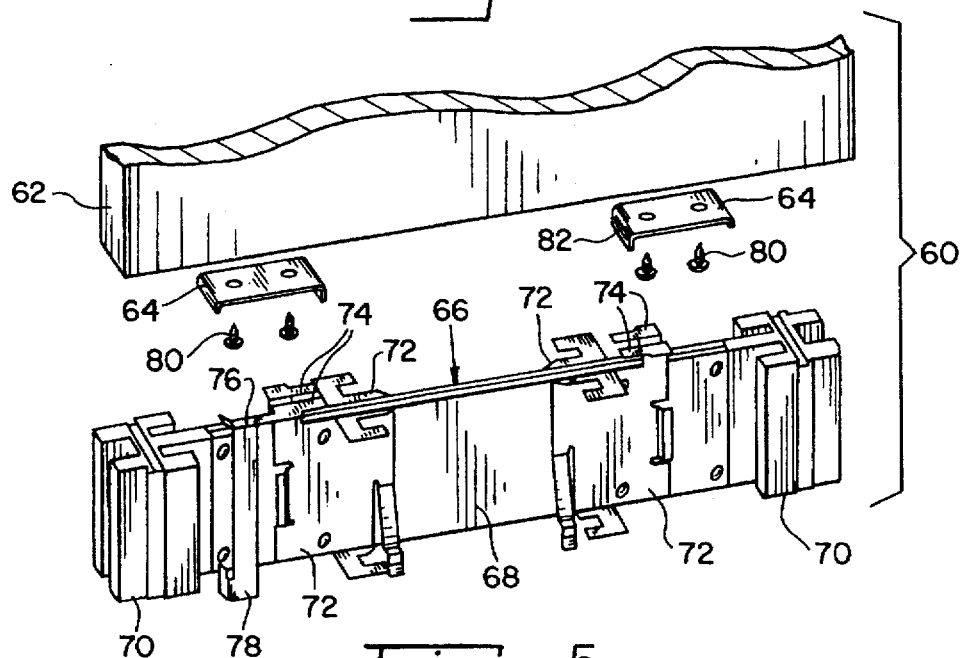
FIG. 5 is an exploded, perspective view of another embodiment of a modular electrical system of the present invention.

FIGS. 5 and 6 illustrate another embodiment of a modular electrical system 60 of the present invention, including a modular office partition 62, bracket 64 and electrical distribution assembly 66.

Electrical distribution assembly 66 includes a channel 68 which is connected at opposing ends thereof to connector blocks 70. Four plates 72 are connected to channel 68 and provide attachment with respective electrical outlets (not shown) which in turn are connected to connector blocks 70. A plurality of longitudinal projections 74 (which are defined as being longitudinal relative to plates 72 and the longitudinal direction of channel 68) are formed integral with and extend from respective plates 72. Attached to one of the longitudinal projections 74 is a resilient retainer 76, including a lever 78 extending therefrom. Resilient retainer 76 securably and releasably maintains longitudinal projections 74 in engagement with brackets 64, as will be described in more detail hereinafter, such that electrical distribution assembly 66 is connected to partition 63. Brackets 64 are attached to partition 62 using suitable fasteners, such as screws 80. Each bracket 64 includes an opening therein, one of which is visible and referenced 82 in FIG. 5. Opening 82 is sized and configured such that a pair of adjacent longitudinal projections 74 may be received therein, as shown in FIG. 6. With longitudinal projections 74 disposed within respective openings 82 of brackets 64, resilient retainer 76 snaps into place within one of brackets 64 to inhibit relative movement between electrical distribution assembly 66 and brackets 64, as shown in FIG. 6.

To connect electrical distribution assembly 66 to brackets 64, longitudinal projections 74 shown on the right in FIG. 5 are first placed within the respective opening 82 and electrical distribution assembly 66 is slid to the left. Thereafter, longitudinal projections 74 on the left in FIG. 5 are placed within the respective opening 82 of bracket 64 and electrical distribution assembly 66 is moved back to the right until resilient retainer 76 snaps into engagement within bracket 64, as shown in FIG. 6. To disengage electrical distribution assembly 66 from brackets 64, lever 78 is grasped by a user and rotated as shown by arrow 84 (FIG. 6) such that resilient retainer 76 disengages the respective bracket 64. Electrical distribution assembly 66 may then be moved relative to brackets 64 so as to disengage longitudinal projections 74 from within openings 82.

Figure 7:
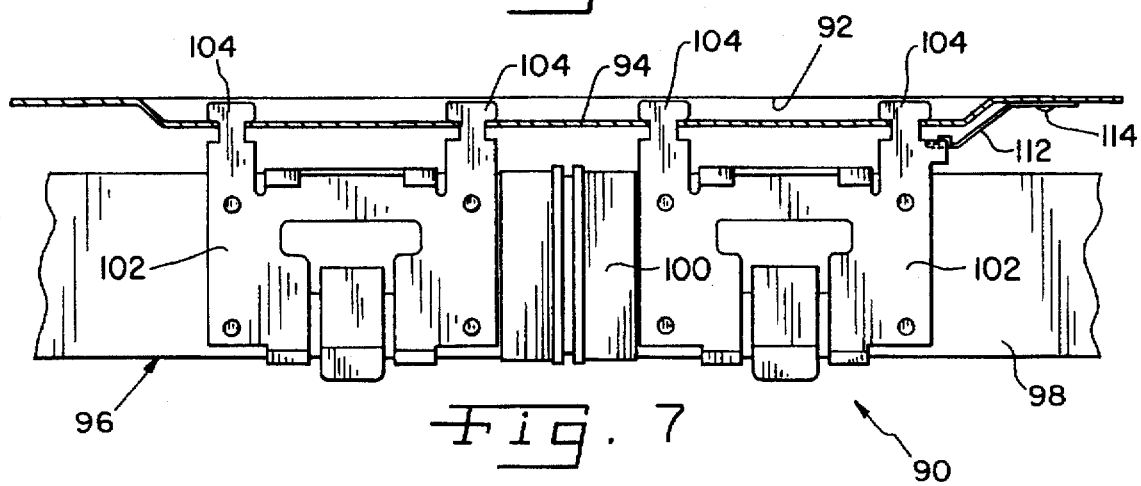
FIG. 7 is a side view of another embodiment of a modular electrical system of the present invention.
Figure 8:
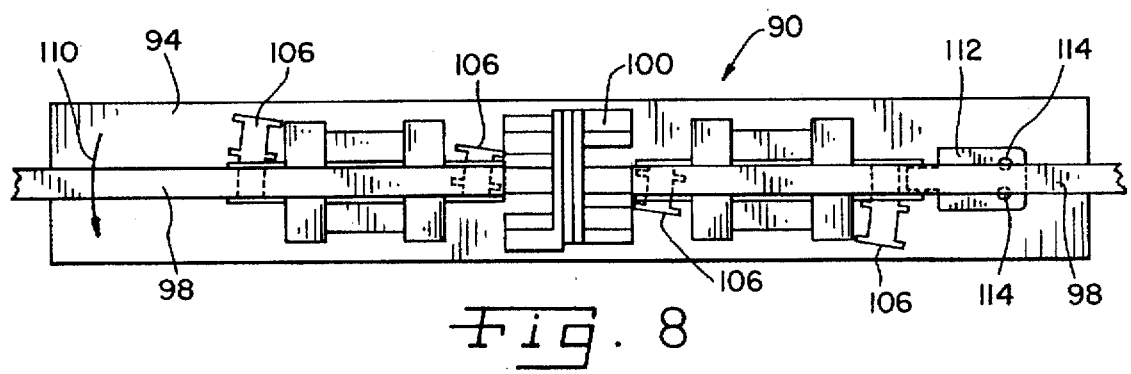
FIG. 8 is a bottom view of the modular electrical system shown in FIG. 7.
Figure 9:
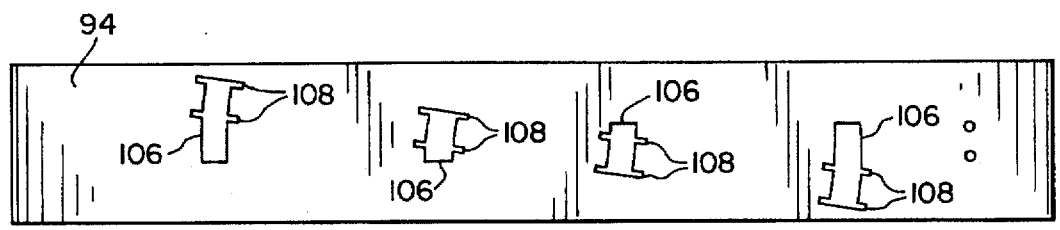
FIG. 9 is a plan view of the bracket shown in FIGS. 7 and 8.

FIGS. 7–9 illustrate another embodiment of a modular electrical system 90 of the present invention, including a partition 92, bracket 94 and electrical distribution assembly 96.

Electrical distribution assembly 96 includes a channel 98 attached to a connector block 100. Plates 102 are connected to channel 98 and provide for attachment between an electrical outlet (not shown) and connector block 100. Each plate includes two pairs of projections 104 which extend therefrom in a substantially parallel direction relative to a respective plate 102.

Bracket 94 (FIGS. 8 and 9) is formed with four arcuate openings 106 having a spacing therebetween corresponding to the spacing between parallel projections 104. Each arcuate opening 106 includes a pair of slots 108 which are sized for receiving parallel projections 104 therein.

A resilient retainer 112 is attached to bracket 94, such as by rivets 114. Resilient retainer 112 securably and releasably maintains projections 104 in engagement with openings 106 in bracket 94.

To assemble electrical distribution assembly 96 with bracket 94, electrical distribution assembly 96 is placed under bracket 94 such that the eight parallel projections 104 align with the eight slots 108 in bracket 94. Parallel projections 104 are then moved through slots 108 and electrical distribution assembly 96 is rotated relative to bracket 94, as indicated by arrow 110 in FIG. 8. Resilient retainer 112 then snaps into engagement with one or more of parallel projections 104, as shown in FIG. 7, to prevent subsequent relative rotation between electrical distribution assembly 96 and bracket 94.

Figure 10:
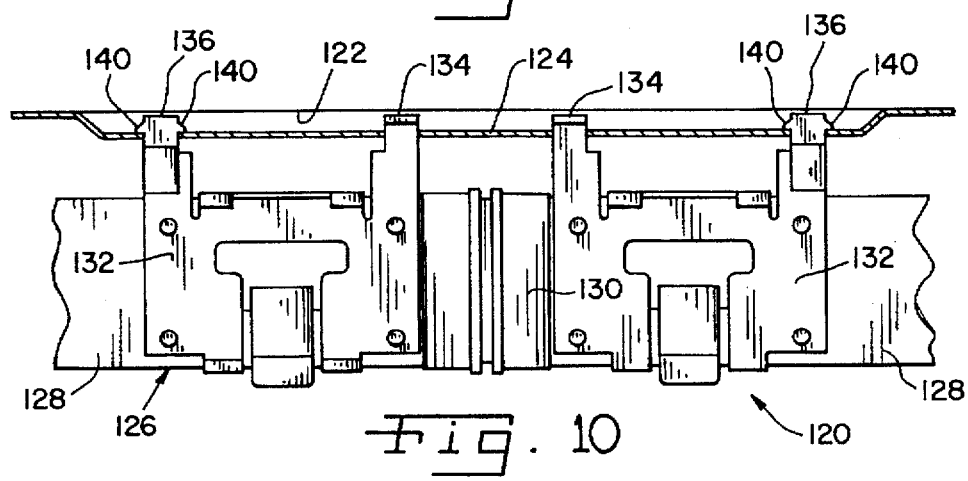
FIG. 10 is a side view of another embodiment of a modular electrical system of the present invention.
Figure 11:
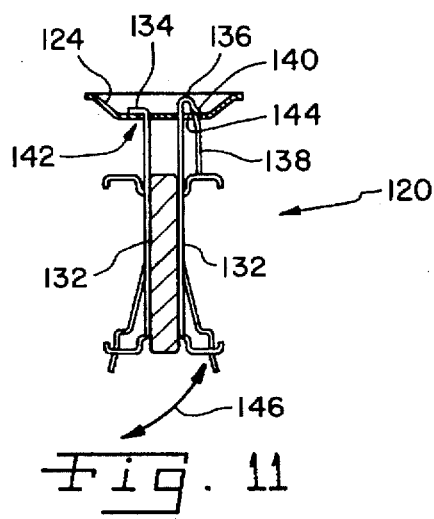
FIG. 11 is an end view of the modular electrical system shown in FIG. 10.

FIGS. 10 and 11 illustrate another embodiment of a modular electrical system 120 of the present invention, including a partition 122, bracket 124 and electrical distribution assembly 126.

Electrical distribution assembly 126 includes a channel 128 which is attached to a connector block 130. A plurality of plates 132, and in particular four plates 132, are connected to channel 128, and used for fastening a plurality of electrical outlets (not shown) with connector block 130. Projections 134, 136 extend from respective plates 132 and connect with bracket 124, as will be described in more detail hereinafter. Projections 134 include a lateral projection which extends laterally from a respective plate 132. Projections 136 include a resilient retainer 138 formed integrally therewith, as well as lips 140.

Bracket 124 includes openings 142, 144 which are sized and configured for respectively receiving projections 134, 136 therein.

To assemble electrical distribution assembly 126 with bracket 124, projections 134 are first placed within openings 142 of bracket 124. Thereafter, electrical distribution assembly 126 is rotated in a sideways manner, as indicated by arrow 146 in FIG. 11, such that projections 136 are received within openings 144. Resilient retainer 138 causes lips 140 to engage the top of bracket 124, thereby preventing relative movement between electrical distribution assembly 126 and bracket 124. To disengage electrical distribution assembly 126 from bracket 124, resilient retainer 138 is depressed toward projection 134 such that lips 140 disengage bracket 124 within openings 144. Electrical distribution assembly 126 may then be rotated clockwise (as viewed in FIG. 11) and projections 134 removed from within openings 142.

FIG. 12 illustrates another embodiment of a modular electrical system 150 of the present invention, including a partition 152, bracket 154 and electrical distribution assembly 156.

Electrical distribution assembly 156 includes a channel 158 attached to a connector block 160. Plates 162 are connected to channel 158 and used to mount electrical outlets (not shown) with connector block 160. Projections 164, 166 are also connected to channel 158 via suitable fasteners such as bolts 168. Projection 164 includes a generally longitudinal projection which extends substantially parallel to the longitudinal direction of channel 158. Projection 166 includes a resilient retainer 170 and lips 172.

Bracket 154 includes openings 174, 176 which are sized and configured for respectively receiving projections 164, 166 therein. Bracket 154 is connected to partition 152 via suitable fasteners (not shown).

To connect electrical distribution assembly 156 with bracket 154, projection 164 is placed within opening 174 of bracket 154. Thereafter, electrical distribution assembly 156 is rotated in a counter-clockwise direction (as shown in. FIG. 12) indicated by arrow 178. Projection 166 is received within opening 176 and lips 172 snap into place above bracket 154, thereby inhibiting relative movement between electrical distribution assembly 156 and bracket 154. To disassemble electrical distribution assembly 156 from bracket 154, resilient retainer 170 is moved toward projection 164 such that lips 172 disengage from within opening 176. Electrical distribution assembly 156 is then rotated in a clockwise direction (as shown in FIG. 112) and projection 164 is removed from within opening 174.

With each of the embodiments shown in FIGS. 1–12, the electrical distribution assembly is snap-locked into engagement with the bracket without the use of tools. Each of the embodiments includes a resilient retainer which can either be separate from or integral with the projections extending from the electrical distribution assembly. The resilient retainers provide the snap lock engagement between the electrical distribution assembly and bracket, and at the same time allow positive engagement and subsequent removal without the use of tools. The present invention therefore provides easier and quicker interconnection between the electrical distribution assembly and the modular office partition.

In the embodiments shown above, a separate bracket is mounted to the bottom of the partition to which the electrical distribution assembly is attached. However, it will also be appreciated that the projection receiving members in the form of J-shaped hooks, openings or the like may just as easily be directly formed in the bottom of the partition, as opposed to being formed in a separate bracket. Moreover, the electrical distribution assembly need not be necessarily mounted to the bottom of the partition, and can just as easily be mounted at another desirable location on the partition.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular electrical system attachable to a modular office partition, comprising:
    an electrical distribution assembly including at least two projections extending from one side thereof;
    at least two projection receiving members associated with the partition, each said projection being engageable with a corresponding one of said receiving members, said at least two projections being movable relative to said at least two projection receiving members in at least one predetermined direction such that said each of said at least two projections is engageable with a respective one of said at least two projection receiving members; and
    at least one resilient retainer means including a distal edge biased to a retaining position for securably and releasably positively locking at least one of said projections in engagement with a respective one of said receiving members, said at least one resilient retainer means also being movable to a disengaging position allowing said at least one projection to be disengaged from said corresponding one of said receiving members, at least one of said electrical distribution assembly and said modular office partition including a surface extending transverse to each said at least one predetermined direction, said distal edge of said retainer means abutting said transverse surface, and thereby effecting said positive locking.

2. The modular electrical system of claim 1, further comprising a bracket attachable to the partition, and wherein each said receiving member comprises a J-shaped hook attached to said bracket.

3. A modular electrical system attachable to a modular office partition, comprising:
    an electrical distribution assembly including at least two projections extending from one side thereof;
    at least two projection receiving members associated with the partition, each said projection being engageable with a corresponding one of said receiving members;
    a bracket attachable to the partition, each said projection receiving member comprising an opening in said bracket; and
    at least one resilient retainer beans biased to a retaining position for securably and releasably maintaining at least one of said projections in engagement with a respective one of said receiving members, said at least one resilient retainer means also being movable to a disengaging position allowing said at least one projection to be disengaged from said corresponding one of said receiving members.

4. The modular electrical system of claim 3, wherein each said opening comprises a slot in said bracket.

5. The modular electrical system of claim 1, wherein each said receiving member is connected to the partition.

6. The modular electrical system of claim 1, wherein each said receiving member extends from the partition.

7. The modular electrical system of claim 1, wherein said electrical distribution assembly includes a channel and a plurality of plates attached to said channel, each said projection extending from a respective one of said plates.

8. The modular electrical system of claim 7, wherein each said projection extends substantially laterally from said respective one of said plates.

9. The modular electrical system of claim 7, wherein each said projection extends substantially longitudinally relative to said respective one of said plates.

10. A modular electrical system attachable to a modular office partition, comprising:
    an electrical distribution assembly including a channel, a plurality of plates attached to said channel, and at least two projections, each said projection extending from a corresponding one of said plates, each said projection extending substantially parallel relative to said corresponding plate;
    at least two projection receiving members associated with the partition, each said projection being engageable with a corresponding one of said receiving members; and
    at least one resilient retainer means biased to a retaining position for securably and releasably maintaining at least one of said projections in engagement with a respective one of said receiving members, said at least one resilient retainer means also being movable to a disengaging position allowing said at least one projection to be disengaged from said corresponding one of said receiving members.

11. The modular electrical system of claim 7, wherein each said receiving member comprises a J-shaped hook.

12. The modular electrical system of claim 7, further comprising a bracket attachable to the partition, and wherein each said receiving member comprises an opening in said bracket.

13. The modular electrical system of claim 1, wherein said at least one resilient retainer means comprises a spring catch engageable with at least one of said projections when said projections are engaged with said receiving members.

14. The modular electrical system of claim 1, wherein at least one of said projections includes one of said at least one resilient retainer means.

15. The modular electrical system of claim 14, wherein each said projection is comprised of a resilient material allowing elastic deformation of said projection in a predetermined direction, said resilient material defining said at least one resilient retainer means.

16. A modular electrical system, comprising:
    an electrical distribution assembly;
    a modular office partition;
    one of said electrical distribution assembly and said partition including at least two openings associated therewith;
    at least two projections connected to and extending from the other of said electrical distribution assembly and said partition, each said projection being engageable with a corresponding one of said openings, said at least two projections and said at least two openings being movable relative to each other in at least one predetermined direction such that said each of said at least two projections is engageable with said corresponding one of said at least two openings; and at least one resilient retainer means including a distal edge biased to a retaining position for securably and releasably positively locking at least one of said projections in engagement with a respective one of said openings, said at least one resilient retainer means also being movable to a disengaging position allowing said at least one projection to be disengaged from said respective one of said openings;

at least one of said electrical distribution assembly and said modular office partition including a surface extending transverse to each said at least one predetermined direction, said distal edge of said retainer means abutting said transverse surface, and thereby effecting said positive locking.

17. A modular electrical system, comprising:

an electrical distribution assembly;

a modular office partition;

a bracket attached to the partition, said bracket including at least two openings;

at least two projections connected to and extending from said electrical distribution assembly, each said projection being engageable with a corresponding one of said openings; and at least one resilient retainer means biased to a retaining position for securably and releasably maintaining at least one of said projections in engagement with a respective one of said openings, said at least one resilient retainer means also being movable to a disengaging position allowing said at least one projection to be disengaged from said respective one of said openings.

18. A modular electrical system, comprising:

an electrical distribution assembly;

a modular office partition;

a bracket attached to the partition, said bracket including two openings;

at least two projections connected to and extending from said electrical distribution assembly, each said projection being engageable with a corresponding one of said openings; and at least one resilient retainer means biased to a retaining position for securably and releasably maintaining at least one of said projections in engagement with a respective one of said openings, said at least one resilient retainer means also being movable to a disengaging position allowing said at least one projection to be disengaged from said respective one of said openings.

19. The modular electrical system of claim 16, wherein said at least one resilient retainer means comprises a spring catch engageable with at least one of said projections when said projections are engaged with said openings.

20. The modular electrical system of claim 16, wherein at least one of said projections includes one of said at least one resilient retainer means.

21. The modular electrical system of claim 20, wherein each said projection is comprised of a resilient material allowing elastic deformation of said projection in a predetermined direction, said resilient material defining said at least one resilient retainer means.

* * * * *

UNITED STATES PATENT AND TRADEMARK OFFICE
CERTIFICATE OF CORRECTION

PATENT NO. : 5,728,970
DATED : March 17, 1998
INVENTOR(S) : Ronald E. Karst, et al.

It is certified that error appears in the above-identified patent and that said Letters Patent is hereby corrected as shown below:

COLUMN 4

Line 65, delete "63" and substitute --62-- therefor.

Signed and Sealed this

Twelfth Day of May, 1998

Attest:

BRUCE LEHMAN

Attesting Officer     Commissioner of Patents and Trademarks